(No Model.)
G. E. MARTIN.
ROTARY PLUG COCK.
No. 597,728. Patented Jan. 25, 1898.
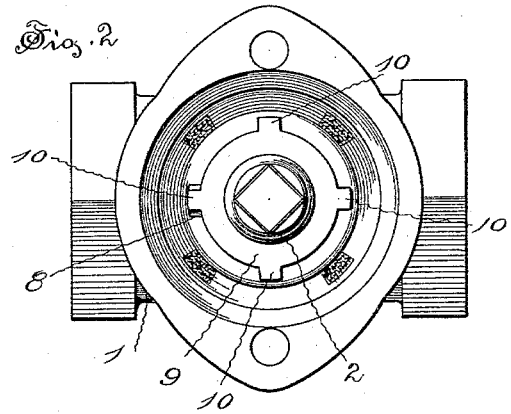
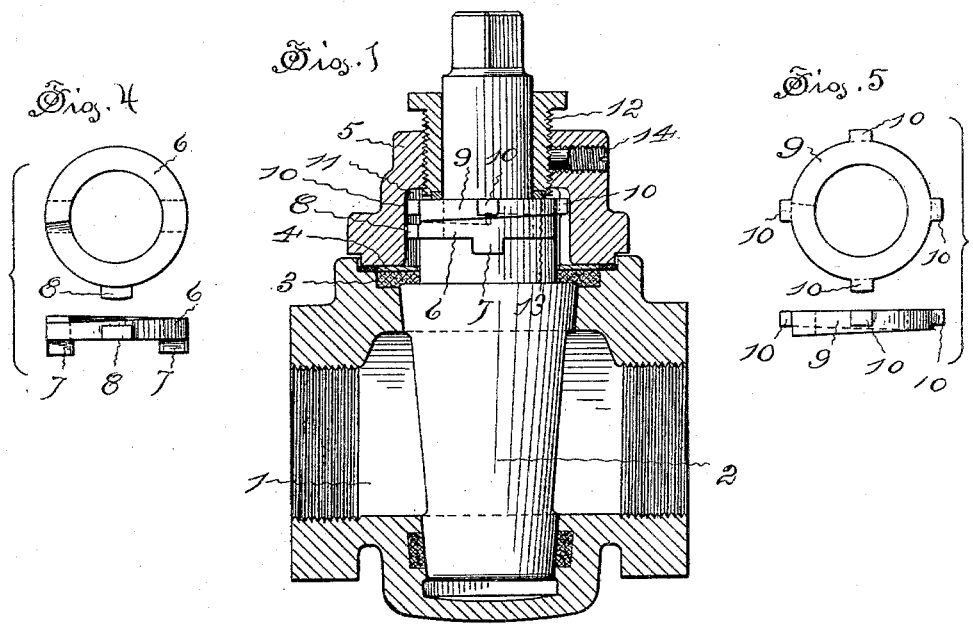
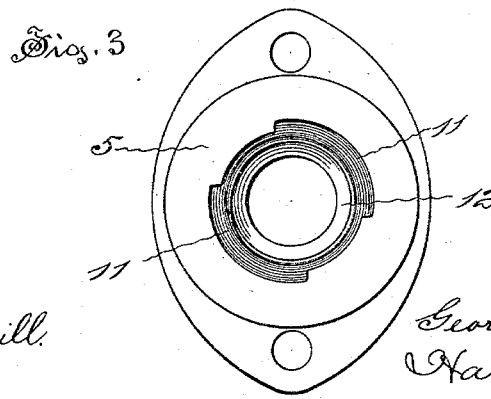
Witnesses:
E. W. Fothergill.
E. J. Hyde.
Inventor,
George E. Martin
by Harry P. Williams
atty.

UNITED STATES PATENT OFFICE.

GEORGE E. MARTIN, OF HARTFORD, CONNECTICUT, ASSIGNOR TO THE PRATT & CADY COMPANY, OF SAME PLACE.

ROTARY-PLUG COCK.

SPECIFICATION forming part of Letters Patent No. 597,728, dated January 25, 1898.

Application filed July 31, 1897. Serial No. 646,574. (No model.)

*To all whom it may concern:*

Be it known that I, GEORGE E. MARTIN, a citizen of the United States, residing at Hartford, in the county of Hartford and State of Connecticut, have invented certain new and useful Improvements in Rotary-Plug Cocks, of which the following is a specification.

This invention relates to those cocks which have a rotary plug that when turned to shut the fluid-passage is forced closely against seats in a tapering-plug chamber in order to insure tight joints, and that when turned to open the fluid-passage is so relieved that it will turn easily.

The object of this invention is to provide a cock of this nature which will open very easily and shut very tightly, the working parts being so constructed and arranged that they can be renewed when necessary and exact adjustment can be obtained when desired, thus producing a simple, inexpensive, efficient, and durable cock.

The embodiment of the invention shown in the accompanying drawings has a body with fluid-ports and tapering-plug chamber, a tapering plug with a fluid-way, a wedge-collar on the plug, a bonnet over the plug-chamber, an adjustable bushing borne by the bonnet, and a wedge-washer located between the collar and the bushing, as more particularly hereinafter described, and pointed out in the claims.

Figure 1 of the drawings shows a vertical longitudinal section of the body, bonnet, and bushing, with the plug, the collar, and the washer in place. Fig. 2 is a plan of the cock with the bonnet and bushing removed. Fig. 3 is a view of the inside of the bonnet. Fig. 4 shows a plan and an edge view of the wedge-collar. Fig. 5 shows a plan and an edge view of the wedge-washer.

The body 1 of the cock may be cast to shape, of iron, brass, or any other suitable metal, with a tapering-plug chamber, the usual ports, and with either flanged or screw-threaded ends, as desired. The walls of the plug-chamber may be smooth or they may be grooved and packed to provide the seats for the plug around the ports.

The plug 2 is made of any suitable metal on the correct taper to fit the seats in the plug-chamber, with the usual fluid-passage and a shoulder at the large end. In a recess in the body and resting on the shoulder of the plug is a packing-ring 3, and outside of this ring is a retaining-ring 4.

The bonnet 5 may be held to the body over the plug-chamber by bolts or screws, and when it is secured in place the packing-ring is compressed and held by the retaining-ring in a manner that insures a tight joint at the large end of the plug.

On the stem of the plug is a collar 6. This collar is provided with lugs 7, which extend into mortises in the end of the plug, so that the collar and plug rotate together. Projecting from one side of this collar into a recess 11 in the walls of the bonnet is a stud 8, which stud is arranged to engage the ends of the recess to limit the rotary movement—that is, the stud engages one end of the recess to stop the plug when the ports are fully opened and the stud engages the other end of the recess to stop the plug when the ports are completely closed. One face of this collar is provided with a curved incline which forms a circular wedge. Engaging with the inclining face of the collar is a correspondingly-curved incline or circular wedge on the face of the washer 9. Projecting from the edges of this washer are lugs 10, arranged to extend into recesses 11 in the walls of the bonnet, so that the washer is held against rotation when the plug and collar are rotated.

The bonnet shown is threaded, and fitted so as to turn in these threads is a bushing 12. The inner end of this bushing is adapted to make contact with the outer face of the washer 9 or a ring 13, of antifriction material, that may be located between the end of the bushing and the washer, if desired, to reduce the friction. A set-screw 14 can be turned into a perforation in the side of the bonnet, so as to engage and hold the bushing when adjusted to the proper position.

The plug is placed in the plug-chamber, and the packing-ring and retaining-ring are located in position about the stem of the plug. Then after the collar and washer have been placed on the stem of the plug the bonnet is secured in place and the bushing turned down until it makes proper engagement with the washer.

When the plug is turned to open the fluid-way, as shown in the views, the engaging curved inclines or circular wedges on the adjacent faces of the collar and washer are in such position that the combined thickness of these parts is at a minimum, but when the plug is turned to close the fluid-way these wedge surfaces engage in such manner as to increase the combined thickness of the collar and washer, and as the bushing prevents them from spreading upwardly the wedging action incident to their spreading is exerted on the end of the plug. This forces the plug tightly into the tapering-plug chamber, where it remains tight until again relieved by the turning of the plug in the opposite direction.

The bonnet is permanently secured in position, and the packing-ring that keeps the parts tight is always subjected to the same amount of compression. If, due to wear or from any other cause, the plug does not fit sufficiently tight in the plug-chamber, the bushing can be turned so as to hold the washer a little nearer the plug, and then the wedging action of the washer and collar will force the plug tightly into the plug-chamber. When the bushing is properly adjusted, it is held in that position by the set-screw.

A plug-cock constructed in this manner can be quickly and exactly adjusted so it will open and close very easily and shut very tightly. The working parts of this cock can be renewed or repaired, if desired, but as there is considerable adjustment repairs for keeping the cock tight are not often necessary.

I do not broadly claim that it is new with me to place an adjustable wedge-disk between the end of the plug and the inside of the cap; but

What I claim as my invention is—

1. A plug-cock having a body with a plug-chamber and ports, a plug located in the plug-chamber, a bonnet secured to the body over the plug-chamber, a collar with a circular wedge surface connected with the plug, a washer with a circular wedge surface engaging the wedge surface of the collar, and a bushing adjustably supported by the bonnet and adapted to locate the washer, substantially as specified.

2. A plug-cock having a body with a plug-chamber and ports, a plug located in the plug-chamber, a bonnet secured to the body over the plug-chamber, a collar with a circular wedge surface connected with the plug, a washer engaging the wedge surface of the collar, a bushing adjustably supported by the bonnet and adapted to locate the washer, with a circular wedge surface, and a set-screw adapted to hold the bushing against movement, substantially as specified.

3. A plug-cock having a body with a plug-chamber and ports, a plug located in the plug-chamber, a bonnet secured to the body over the plug-chamber, a packing-ring at the end of the plug held in position by the bonnet, a collar connected with the plug, a washer engaging the wedge surface of the collar, and a bushing adjustably supported by the bonnet and adapted to locate the washer, substantially as specified.

4. A plug-cock having a body with a plug-chamber and ports, a plug located in the plug-chamber, a bonnet secured to the body over the plug-chamber, a packing-ring at the end of the plug, a retaining-ring located outside of the packing-ring and held in position by the bonnet, a collar with a circular wedge surface connected with the plug, a washer with a circular wedge surface engaging the wedge surface of the collar, and a bushing adjustably supported by the bonnet and adapted to locate the washer, substantially as specified.

5. A plug-cock having a body with a plug-chamber and ports, a plug located in the plug-chamber, a bonnet secured to the body over the plug-chamber, a collar with a circular wedge surface connected with the plug, a washer with a circular wedge surface engaging the wedge surface of the collar, a bushing adjustably supported by the bonnet, and a ring between the end of the bushing and the washer, substantially as specified.

6. A plug-cock having a body with a plug-chamber and ports, a plug located in the plug-chamber, a bonnet secured to the body over the plug-chamber, a collar with a circular wedge surface connected with the plug, said collar having a stud extending into a recess in the walls of the bonnet, a washer with a circular wedge surface engaging the wedge surface of the collar, and a bushing adjustably supported by the bonnet and adapted to locate the washer, substantially as specified.

7. A plug-cock having a body with a plug-chamber and ports, a plug located in the plug-chamber, a bonnet secured to the body over the plug-chamber, a collar with a circular wedge surface connected with the plug, a washer with a circular wedge surface engaging the wedge surface of the collar, said washer having lugs that extend into recesses in the walls of the bonnet, and a bushing adjustably supported by the bonnet and adapted to locate the washer, substantially as specified.

GEORGE E. MARTIN.

Witnesses:
ERNEST CADY,
HARRY R. WILLIAMS.